UNITED STATES PATENT OFFICE.

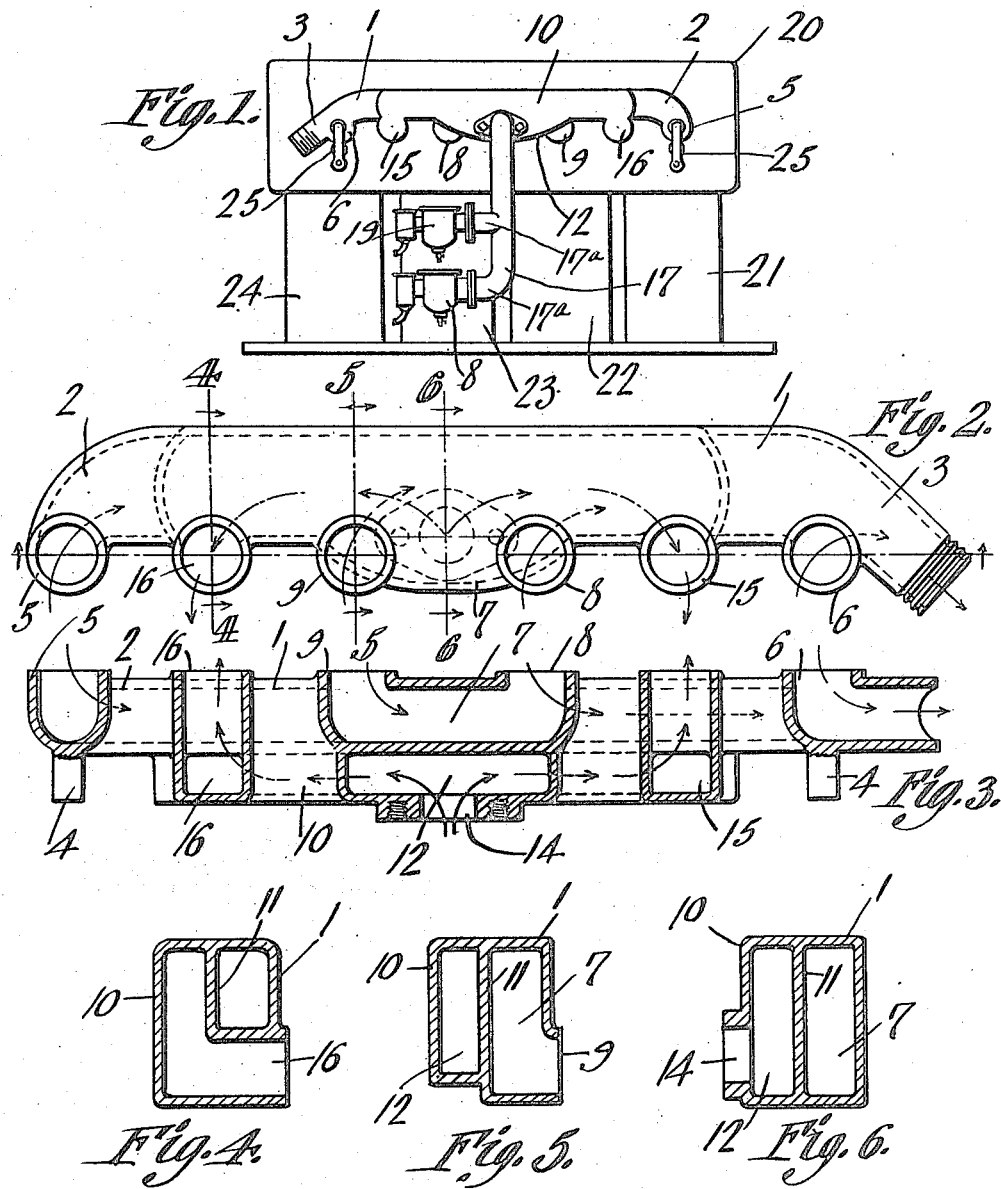

LEROY C. GRIFFIN AND PRIOR A. JONES, OF CAIRO, GEORGIA.

AUTO ATTACHMENT.

1,222,860. Specification of Letters Patent. Patented Apr. 17, 1917.

Application filed July 11, 1916. Serial No. 108,695.

*To all whom it may concern:*

Be it known that we, LEROY C. GRIFFIN and PRIOR A. JONES, citizens of the United States, residing at Cairo, in the county of Grady, State of Georgia, have invented a new and useful Auto Attachment, of which the following is a specification.

The device forming the subject matter of this application is adapted to be applied to an internal combustion engine, for the purpose of conducting fuel to the engine, and for the purpose of conducting the exhaust from the engine.

The invention aims to provide a novel structure whereby the fuel may be adequately heated by the exhaust, before the fuel enters the engine.

Another object of the invention is to provide novel means whereby the engine may be started on a comparatively volatile liquid, such as gasolene, and then be operated on a less volatile liquid, such as kerosene oil.

It is another object of the invention to provide a simple one-piece structure whereby the results above contemplated may be carried out.

With the above and other objects in view which will appear as the description proceeds, the invention resides in the combination and arrangement of parts and in the details of construction hereinafter described and claimed, it being understood that changes in the precise embodiment of the invention herein disclosed can be made without departing from the spirit of the invention.

In the accompanying drawings:—

Figure 1 shows in side elevation, a portion of an internal combustion whereunto the structure forming the subject matter of this application has been applied;

Fig. 2 is an elevation depicting the exhaust manifold side of the structure;

Fig. 3 is a longitudinal section of the device forming the subject matter of this application, detached from the engine as shown in Fig. 2;

Fig. 4 is a cross section on the line 4—4 of Fig. 3;

Fig. 5 is a cross section on the line 5—5 of Fig. 3; and

Fig. 6 is a cross section on the line 6—6 of Fig. 3.

The device forming the subject matter of this application includes an exhaust manifold and a fuel intake manifold, formed integrally and located side by side, the construction being such that the fuel proceeding through the fuel manifold will be heated by the exhaust traversing the exhaust manifold, the manifolds being provided with suitable lateral ports, opening on one side of the structure, and the fuel intake manifold being provided with an intake port located on the other side of the structure. The device is fashioned from metal throughout.

In carrying out the present invention there is provided a tubular exhaust manifold 1 having depending ends 2 and 3. The end 2 is an intake end, the exhaust leaving the manifold 1 by way of the outlet end 3. Adjacent its extremities, the manifold 1 is equipped with attaching lugs 4. The end 2 of the manifold 1 is provided with a lateral inlet port 5 for the exhaust, this port being shown to best advantage in Figs. 2 and 3. Near to its outlet end 3, the tubular exhaust manifold 1 is supplied with an exhaust inlet port 6, which is a lateral port, and opens in the same direction as the port 5. Intermediate its ends, the manifold 1 is depressed to form an elongated chamber 7 provided at its extremities with exhaust inlet ports 8 and 9, opening in the same direction as the ports 5 and 6.

Formed integrally with the tubular exhaust manifold 1 and separated therefrom by a common wall 11 is a fuel intake manifold 10 which is somewhat shorter than the tubular exhaust manifold 1. Intermediate its ends, the fuel intake manifold 10 is depressed to form a chamber 12 located opposite to the chamber 7 of the exhaust manifold 1. At its ends, the intake manifold 10 is equipped with lateral fuel outlets 16 and 15 formed integrally with the tubular exhaust manifold 1 and extending beneath the manifold 1, the fuel outlets 15 and 16 opening in the same direction as the ports 5, 6, 8 and 9. The port 15 is located between the ports 6 and 8, and the port 16 is located between the ports 5 and 9. Intermediate its ends, the chamber 12 of the fuel intake manifold 10 is supplied with a fuel inlet port 14, opening on the opposite side of the structure from the ports 5, 16, 9, 8, 15 and 6.

Detachably assembled with the intake manifold 10 is a fuel supply pipe 17 provided with lateral branches 17ª. With the branches 17ª are connected, respectively, carbureters 18 and 19. It is to be understood that the branches 17ª and the carbureters may be located as found expedient or necessary. One of the carbureters 18—19 is adapted to handle a relatively volatile fluid such as gasolene, whereas the other of the carbureters is adapted to handle a less volatile fuel, such as kerosene oil.

The numeral 20 denotes an engine, in the present instance shown as comprising cylinders 21, 22, 23 and 24. By means of suitable attaching mechanisms 25, assembled with the lugs 4, the structure shown in Figs. 2 and 3 is held in place on the engine.

Fuel delivered by the pipe 17 passes into the chamber 12 and thence by way of the manifold 10 to the ports 15 and 16. From the port 15, the fuel is delivered in the cylinders 24 and 23, and from the port 16 the fuel is delivered to the cylinders 22 and 21. The exhaust from the cylinder 21 is delivered into the manifold 1 by way of the port 5. The manifold 1 receives the exhaust from the cylinder 22 through the port 9. The port 8 conducts the exhaust to the manifold 1 from the cylinder 23. The exhaust finds an exit from the cylinder 24 into the manifold 1 by way of the port 6. From the manifold 1, the exhaust leaves by way of the end 3.

In practical operation, one of the carbureters 18 and 19 is put into operation to deliver a relatively volatile fuel, such as gasolene. After the engine has operated for a time, this carbureter is cut out, and the other carbureter is put into operation, to supply a less volatile fuel, such as kerosene oil. It will be seen that, owing to the close proximity of the intake manifold 10 to the exhaust manifold 1, the fuel, whatever be its nature, will be heated adequately, before it is delivered to the cylinders of the engine.

The device forming the subject matter of this application is of simple construction and is fashioned in one piece. It will be found to be of great strength and well adapted to withstand the strains imposed on structures of this sort. Further, it is so arranged that an adequate heating of the fuel will be brought about, before the fuel is delivered to the engine, thus making it possible to use either an extremely volatile fuel such as gasolene, or a less volatile fuel, of which kerosene may be taken as typical.

Having thus described the invention, what is claimed is:—

A device of the class described comprising in a one-piece structure, a tubular exhaust manifold and a fuel intake manifold formed integrally with the exhaust manifold and located on the outer side of the exhaust manifold, the intake manifold being shorter than the exhaust manifold and having its ends spaced from the ends of the exhaust manifold, the manifolds being separated by a common integral wall, the manifolds being of equal height and being depressed intermediate their ends to form chambers of the same size and located side by side, one end of the exhaust manifold being open to form an exhaust outlet, both ends of the exhaust manifold being provided with lateral inlet ports, the intake manifold being provided at its ends with a pair of lateral outlet ports extended beneath the exhaust manifold and integral therewith to form a reinforcement, the chamber of the exhaust manifold being provided at its ends with a pair of lateral exhaust inlet ports, all of the above specified lateral ports opening at one side of the device, and the chamber of the intake manifold being provided intermediate its ends with a lateral fuel inlet port opening on the opposite side of the device from the above specified lateral ports.

In testimony that we claim the foregoing as our own, we have hereto affixed our signatures in the presence of two witnesses.

LEROY C. GRIFFIN.
PRIOR A. JONES.

Witnesses:
P. R. VAN LANDINGHAM.
H. L. HUGHES.